UNITED STATES PATENT OFFICE.

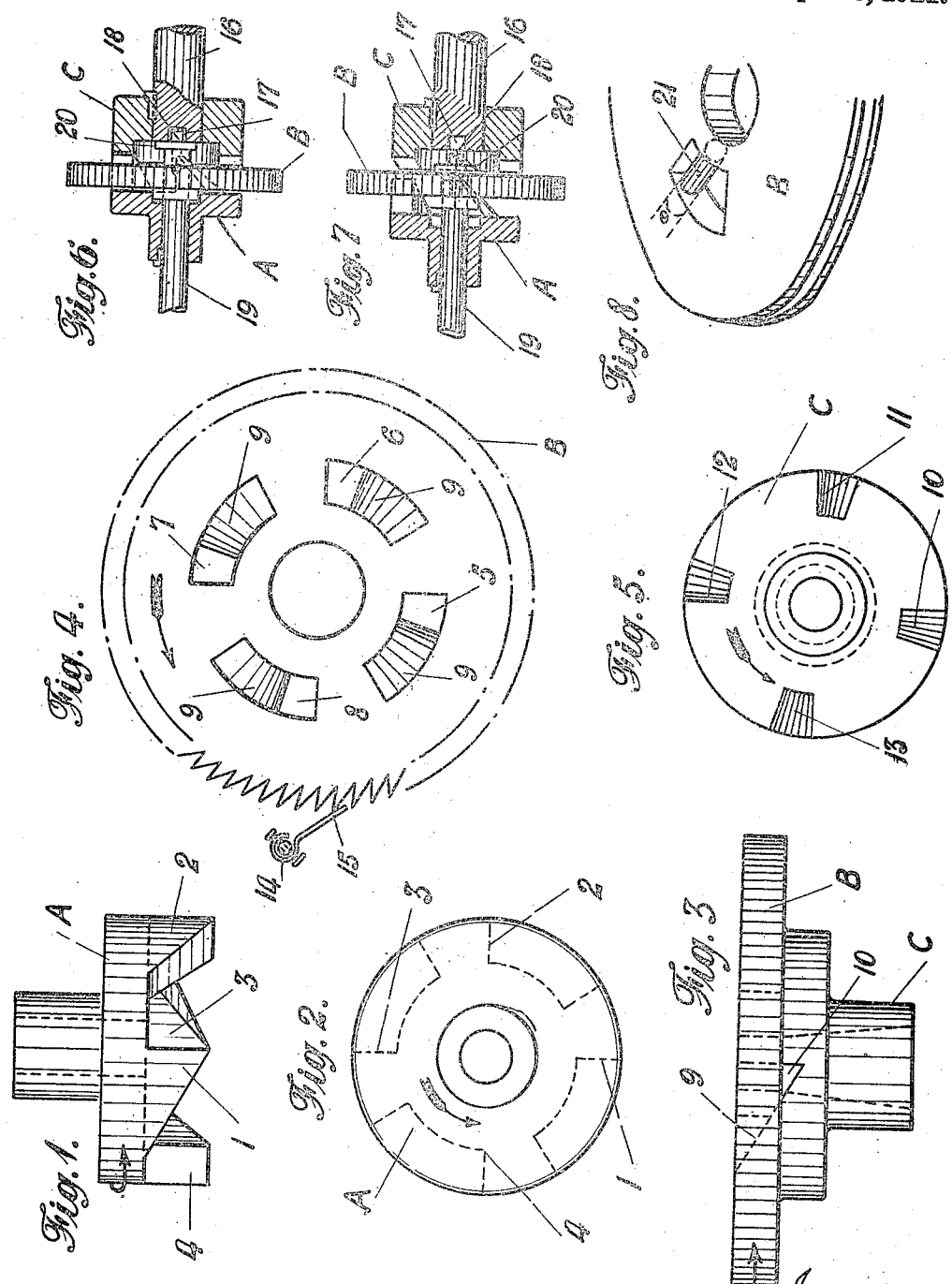

JOHN THOMAS DALTON AND CHARLES DALTON, OF BERRY BROW, NEAR HUDDERSFIELD, ENGLAND.

CLUTCH FOR THE ENGAGEMENT AND DISENGAGEMENT OF SHAFTS.

1,376,007.  Specification of Letters Patent.  Patented Apr. 26, 1921.

Application filed September 8, 1920. Serial No. 408,969.

*To all whom it may concern:*

Be it known that we, JOHN THOMAS DALTON and CHARLES DALTON, subjects of the King of Great Britain and Ireland, residing at Berry Brow, near Huddersfield, in the county of York, England, have invented certain new and useful Improvements in Clutches for the Engagement and Disengagement of Shafts, of which the following is a specification.

The subject of this invention is a clutch comprising one normally operative member having wedge shaped teeth or projections and another normally operative member having correspondingly shaped recesses or opposing teeth, a wheel being interposed between these two members and having slots through which pass the teeth of the first member when in engagement with the recesses of the second member, the said wheel then rotating freely along with the said operative members, but being provided with inclines or rollers at each slot, by means of which inclines or rollers when the wheel is held, the said teeth can be withdrawn from engagement.

The clutch members may be secured on two shafts in the same axial line, or one or both may be on a boss or bosses on a continuous shaft one of such bosses being slidable. For example, the toothed member may be connected to the starting handle of a motor car or the like, when a reversed rotation of the other member due to back-firing will immediately set free the said starting handle, thus minimizing the danger to the person operating the handle. The invention however is applicable to mill gearing, to the starting of aeroplanes, and in other positions where suitable.

In order that our said invention may be clearly understood, we have annexed drawings illustrating same.

Figure 1 is an elevation and Fig. 2 a plan of a toothed driving member.

Fig. 3 is an elevation showing the disengaging wheel and the recessed driven member in conjunction.

Fig. 4 is a plan of the disengaging wheel.

Fig. 5 is a plan of the recessed driven member.

Fig. 6 is a sectional elevation showing a toothed driving member keyed upon a shaft in engagement with a recessed driven member upon an axially opposed shaft.

Fig. 7 corresponds with Fig. 6 except that the parts are shown in their disengaged positions.

Fig. 8 is a perspective view showing a portion of a grooved brake wheel with rollers.

Referring to Figs. 1 to 5 in which the arrows indicate the normal direction of rotation, the letter A indicates the driving member having four teeth numbered respectively 1, 2, 3 and 4; B is the disengaging wheel having four slots 5, 6, 7 and 8, each slot having an incline 9 (Fig. 4); and C is the driven member having four recesses 10, 11, 12, 13 (Fig. 5). In the driving position the tooth 1 passes through the slot 5 and enters the recess 10; the tooth 2 passes through the slot 6 and enters the recess 11. On a stud 14 is secured a flat spring 15 engaging the teeth of the wheel B, over which teeth it rattles when the wheel is driven by the teeth 1, 2, 3, 4, in the direction of the arrows, but as soon as the direction of rotation is reversed the spring obstructs the wheel B and the teeth mount the inclines 9, setting free the driving member A.

In Figs. 6 and 7, the recessed member C rotates with the shaft 16, which may be the engine shaft of an internal combustion engine, in the end of which shaft 16 is a hole 17 into which can be placed the pin or stud 18 on the end of the shaft 19, on which shaft 19 is the free ratchet wheel B. This shaft 19 may form part of the starting handle of such engine. When the teeth are forced up the inclines in the wheel B by reversal of rotation due to back-firing, the two shafts 16 and 19 are thereby forced apart so that the collar 20 comes against the wheel B. The teeth are preferably truncated as shown, or curved, as sharp points thereon would be subject to excessive wear.

In Fig. 8 the numeral 21 indicates a roller over which the inclined back of one of the teeth on the member A can slide out of engagement when the wheel B is held fast. Assuming the teeth to be on the driving member and the wheel to be a ratchet toothed wheel, when the rotation of the driven shaft is reversed, the teeth automatically mount the inclines of the wheel and become disengaged from the driven member, the ratchet toothed wheel being prevented from revolving in one direction by the pawl in order to effect the disengagement.

What we claim by our invention and de- sire to secure by Letters Patent in the United States is:—

The combination, with a revoluble shaft, and a driven member secured thereon and provided with a series of recesses in its front face; of a revoluble and longitudinally slidable operating shaft arranged in line with the aforesaid shaft, a disengaging wheel journaled loosely on the said operating shaft and provided with a series of slots which register with the said recesses and which have inclined portions, means for preventing the disengaging wheel from revolving backwardly, and a driving member secured on the said operating shaft and provided on its rear face with teeth which project through the said slots and normally engage with the said recesses and which revolve the driven member when the operating shaft is revolved forwardly, said teeth having inclined portions which engage with the inclined portions of the disengaging wheel, said disengaging wheel operating, when held stationary and when the first said shaft is revolved backwardly, to slide the driving member forwardly out of engagement with the driven member.

In testimony whereof we affix our signatures.

JOHN THOMAS DALTON.
CHARLES DALTON.